Jan. 6, 1953     B. P. ILYIN     2,624,287
GEAR PUMP
Filed Oct. 8, 1949
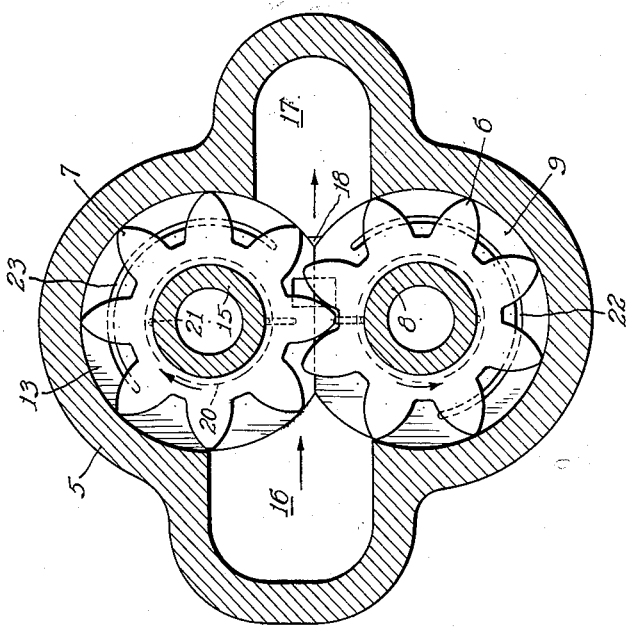
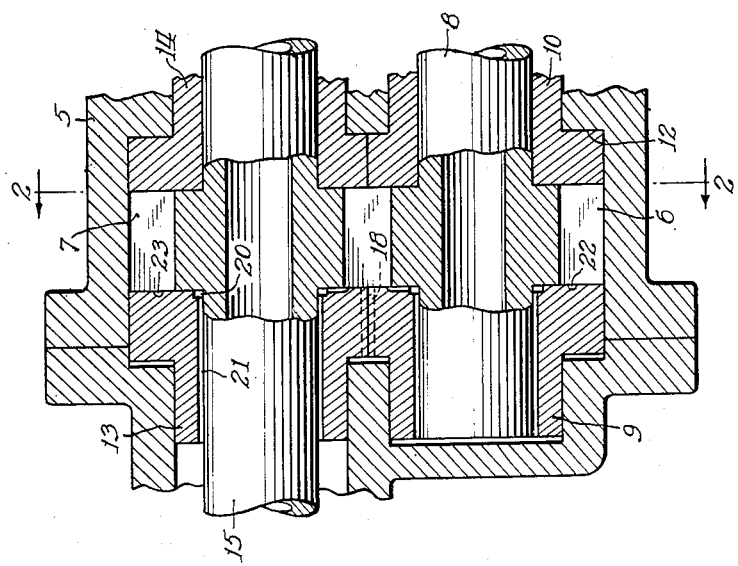
Inventor:
Boris P. Ilyin
By: Edward C. Gitzbaugh
Atty.

Patented Jan. 6, 1953

2,624,287

UNITED STATES PATENT OFFICE 2,624,287

GEAR PUMP

Boris P. Ilyin, Cleveland, Ohio, assignor to Borg-Warner Corporation, Chicago, Ill., a corporation of Illinois Application October 8, 1949, Serial No. 120,349

3 Claims. (Cl. 103—126)

This invention relates to a gear pump, and more particularly to a gear pump of the type employing pressure loaded bushings, such gear pumps sometimes being referred to as pressure loaded pumps.

As is well known, in a pressure loaded gear pump of the type including one set of axially movable, pressure loadable bushings, a part of the output pressure is applied to the rear or motive surfaces of the axially adjustable bushings to urge these bushings into sealing relation with their associated gears. As disclosed in U. S. Patent No. 2,420,622 to Roth et al., by carefully selecting the relative areas of the forward surfaces of the bushings and of the motive surfaces of the bushings, it is possible to control within very close limits the actual sealing pressure provided. Gear pumps so constructed are capable of delivering fluid at extremely high pressures with considerable volume.

When such pumps are operated at high pressures, the bearing loads also become very high, resulting in wear. Because of the self-adjusting characteristics of pressure loaded bushings, a considerable amount of wear may be tolerated, provided that such wear is uniform. However, it has been found that in a gear pump the journal loads on the driving gear are substantially less than the journal loads on the driven gear. This differential in journal load is due primarily to the fact that the driving loads deduct from the driving gear bearing loads and add, by a like amount, to the driven gear bearing loads. It has been found in practice that the difference may amount to there being as much as 40% less load on the driving gear than on the driven gear. This uneven or unbalanced condition results in greatly increased wear and reduces the useful life of the pump. The bushings tend to move relatively to each other and the gear teeth, instead of meshing evenly, will tend to cut into each other as the wear on one bushing progresses at a more rapid rate than on the other bushing.

An object of the present invention is to provide a new and improved pressure loaded type intermeshing gear pump wherein the journal loads between the driving and the driven gears are made substantially equal.

In accordance with one embodiment of this invention, each of the pressure responsive bushings of a pressure loaded type intermeshing gear pump may have formed in the gear side face engaging surface thereof an arcuate balancing groove, disposed coaxially of the bushing and adjacent the gear teeth. One end of each groove communicates with the discharge side of the pump. The grooves are of unequal length, the groove in the bushing associated with the driven gear being substantially longer than the groove formed in the forward surface of the bushing associated with the driving gear. At the same time, the inlet port is offset with respect to the center line of the pump so that the groove associated with the driven gear bushing may be conveniently extended without establishing communication through the groove and the gear teeth with the inlet side of the pump.

Other objects and advantages of the present invention will be apparent from the following detailed description taken in conjunction with the drawings wherein:

Fig. 1 is a fragmentary, axial, sectional view of a pressure loaded type intermeshing gear pump constructed in accordance with one embodiment of this invention; and Fig. 2 is a vertical, sectional view taken substantially along the line 2—2 of Fig. 1 and showing to advantage the arrangement of the balancing grooves and the ports of this pump.

Referring to the drawings, the numeral 5 denotes a suitably chambered gear pump housing in which are rotatably mounted a driven gear 6 and a driving gear 7 intermeshing therewith. Driven gear 6 is supported on a shaft 8 journalled through an axially displaceable, flanged bushing 9, disposed on the left side of driven gear 6 and a fixed, flanged bushing 10 disposed on the right side of gear 6, as viewed in Fig. 1. The gear 6 and associated bushings 9 and 10 are arranged in a first bore 12 formed in the pump housing 5, sufficient clearance being provided between the left end of bushing 9 and the end wall of the housing to permit axial movement of the bushing 9. Similarly, the driving gear 7 has disposed on the left side thereof a pressure responsive, axially movable, flanged bushing 13 and a fixed, flanged bushing 14 is disposed on the right side thereof. Driving shaft 15 on which gear 7 is mounted is journalled in the bushings 13 and 14 and may be suitably secured to any driving means (not shown). The gear 7 and bushings 13 and 14 are located in a second bore formed in housing 5 adjacent and parallel to bore 12. Sufficient clearance is provided between the left end of bushing 13 and the adjacent wall of the housing 5 to permit axial displacement of the bushing.

As best shown in Fig. 2, housing 5 has formed on the left side thereof an inlet port 16 and on the right side thereof an outlet port 17. Pressure generated by the gear pump is communicated from the outlet or discharge of the pump to the motive or pressure responsive surfaces of the movable bushings 9 and 13 through an axially extending passage 18 provided between the peripheries of the flanged portions of the bushings 9 and 13 on the discharge side of the pump at the point of convergence of the bushings. It has been found in practice possible to fit the housing 5 closely enough to the converging peripheries of the bushings on the opposite side from the passage 18 to prevent recirculation of pressure fluid back to the inlet side of the gear teeth. Previously, it has been the practice to provide a closure plug (not shown), but this is not generally necessary.

In accordance with usual pressure loaded pump practice, the radially inner, terminal portions of the forward or gear engaging surfaces of the axially movable bushings have formed therein relief recesses 20 of annular configuration, these relief recesses being placed in communication with the low pressure or inlet side of the pump through axially extending channels or grooves 21 formed through the bushings. These recesses control the effective pressure area of the flanged bushing surfaces or forward surfaces and, hence, the axial forces tending to produce axial movement of the bushings away from the gear side faces. The areas of the pressure responsive motive surfaces are selected so that the forces tending to establish a seal slightly exceed the forces tending to separate the bushings from their associated gear side surfaces.

From the foregoing, it will be readily evident that while the loading pressure will be substantially uniformly distributed over the motive surfaces of the pressure responsive bushings 9 and 13, there will be a very definite pressure gradient between the portions of the bushings adjacent the inlet 16 and the portions of the bushings adjacent the outlet 17, which latter portions will, of course, be subjected to the higher or discharge pressures. A partial answer to this problem is to provide balancing grooves such as the arcuate semi-annular grooves 22 and 23 formed in the forward or gear side face engaging surfaces of the axially movable bushings 9 and 13, respectively. The right ends of these grooves, as viewed in Fig. 2, communicate with the discharge side of the pump, and the grooves are spaced radially outwardly of the gear tooth pockets so as to communicate pressure thereto. Because the grooves extend toward the inlet side of the pump, although not sufficiently to actually communicate therewith, to the extent that the grooves extend, discharge pressure is communicated to a larger area of the gear side face engaging surfaces of the bushings, and the actual pressure per square inch across the gear side faces will tend to be equivalent to that acting on the motive surfaces of the bushings.

It will be apparent that to a large extent it is possible, by employing balancing grooves, to balance out on each gear the journal or bearing loads, since any pressure applied on the inlet side of the gear will tend to reduce the bearing loads. However, as pointed out hereinbefore, it has been found in practice that the journal load on the driving gear is approximately 40% less than the journal load on the driven gear, and that rather than attempt to reduce the over-all journal load to the maximum extent feasible, it is more desirable to reduce the journal load on the driven gear so that it may be made substantially equal to the journal load on the driving gear. Thus, it has been found desirable to make the balancing grooves of unequal length and to form the longer balancing groove in the bushing associated with the driven gear. In this manner, the journal load on the driven gear may be reduced more than the journal load on the driving gear and thereby the two journal loads made approximately equal.

In order to permit extending the balancing groove associated with the driven gear to the maximum feasible extent, the inlet port 16 is offset with respect to the center line of the gear pump so that while a smaller area of the driven gear 6 is exposed to the inlet port, a larger area of the gear 7 is exposed. By locating the walls of the inlet port so that the teeth of both gears coincide therewith at the same time, pulsations at the inlet may be reduced in frequency with a definite improvement in the inlet characteristics of the pump, particularly where the pump is associated with a booster pump. This desirable location of the inlet port may be made in offsetting the inlet port to permit extending the groove associated with the driven gear, in accordance with the present invention.

It will be understood, of course, that neither groove must be so long that at the time any gear tooth pocket is exposed to the inlet port, the end of the groove is also in communication with that tooth pocket. To do so would cause an undesirable loss of pressure.

Because of the disparity in length of the balancing grooves and the offset arrangement of the inlet port, it will be apparent that more gear tooth pockets on the inlet side of the driven gear will be exposed to discharge pressure than on the inlet side of the driving gear. Discharge pressure applied on the inlet side of the gear will, of course, tend to reduce the bearing loads and since a greater area of the driven gear is exposed to discharge pressure on the inlet side thereof, the reduction in bearing load is greater on the driven gear than it is on the driving gear. It will thus be evident that by properly selecting the relative lengths of the balancing grooves, not only can an over-all reduction in bearing load be achieved, but also the bearing loads of the individual gears may be largely equalized.

Where herein the various parts of this invention have been referred to as being located in a right or a left position, it will be understood that this is done solely for the purpose of facilitating description and that such references relate only to the relative positions of the parts as shown in the accompanying drawings.

While but one embodiment of this invention has been shown and described, it will be understood that many changes and modifications may be made therein without departing from the spirit or scope of the invention.

What is claimed is:

1. In an intermeshing gear pump, a housing having an inlet port and a discharge port formed therein, a pair of intermeshing pumping gears journalled in said housing and arranged to force liquid from said inlet out of said housing through said outlet, a pair of bushings associated with said gears and having surfaces adapted to engage the adjacent gear side faces in substantially sealing relation, and means for communicating discharge pressure generated by said gears to gear tooth pockets lying adjacent the inlet port of said pump during the operation thereof, said means comprising a groove formed in the gear side face engaging surface of each of said bushings and communicating at one end with the discharge port of said pump and at the other end with gear tooth pockets of the associated gear adjacent the inlet port of the pump, said grooves being of unequal length and the groove associated with the driven gear of said pump communicating at any instant with more gear tooth pockets than the groove associated with the driving gear whereby a greater number of gear tooth pockets of the driven gear are exposed to discharge pressure than of the driving gear.

2. In an intermeshing gear pump, a housing having an inlet port and a discharge port formed therein, a pair of intermeshing pumping gears journalled in said housing and arranged to force liquid from said inlet out of said housing through said outlet, a pair of bushings associated with said gears and having surfaces adapted to engage the adjacent gear side faces in substantially sealing relation, and means for communicating discharge pressure generated by said gears to gear tooth pockets lying adjacent the inlet port of said pump during the operation thereof, said means comprising a groove formed in the gear side face engaging surface of each of said bushings and communicating at one end with the discharge port of said pump and at the other end with gear tooth pockets of the associated gear adjacent the inlet port of the pump, said grooves being of unequal length and the groove associated with the driven gear of said pump communicating at any instant with more gear tooth pockets than the groove associated with the driving gear whereby a greater number of gear tooth pockets of the driven gear are exposed to discharge pressure than of the driving gear, said inlet port being offset with respect to a reference plane extending along the common tangent to the pitch circles and parallel to the axes of rotation of said gears.

3. In an intermeshing gear pump, a housing having an inlet port and a discharge port formed therein, a pair of intermeshing pumping gears journalled in said housing and arranged to force liquid from said inlet out of said housing through said outlet, a pair of bushings associated with said gears and having surfaces adapted to engage the adjacent gear side faces in substantially sealing relation, and means for communicating discharge pressure generated by said gears to gear tooth pockets lying adjacent the inlet port of said pump during the operation thereof, said means comprising a groove formed in the gear side face engaging surface of each of said bushings and communicating at one end with the discharge port of said pump and at the other end with gear tooth pockets of the associated gear adjacent the inlet port of the pump, said pump having a reference plane passing through the common tangent of the pitch circles of both gears and parallel to the axes of rotation of said gears, said grooves being of unequal length and the groove ends adjacent the outlet of said pump being exposed to outlet pressure during the operation of the pump, the groove associated with the driven gear having its end adjacent the inlet of said pump closer to said plane than the corresponding groove end of the groove associated with the driving gear.

BORIS P. ILYIN.

REFERENCES CITED

The following references are of record in the file of this patent:

UNITED STATES PATENTS

| Number | Name | Date |
| --- | --- | --- |
| 917,466 | Lees | Apr 6, 1909 |
| 1,007,742 | Smith | Nov. 7, 1911 |
| 1,937,367 | Vickers | Nov. 28, 1933 |
| 1,978,480 | Svenson | Oct. 30, 1934 |
| 2,212,994 | Vrolix | Aug. 27, 1940 |
| 2,221,412 | Rose | Nov. 12, 1940 |
| 2,233,709 | Osborne | Mar. 4, 1941 |
| 2,281,767 | Heckert | May 5, 1942 |
| 2,293,126 | Fersing | Aug. 18, 1942 |
| 2,338,065 | Herman | Dec. 28, 1943 |
| 2,345,975 | Ungar et al. | Apr. 4, 1944 |
| 2,349,022 | Roth | May 16, 1944 |
| 2,405,061 | Shaw | July 30,, 1946 |
| 2,420,622 | Ernst | May 13, 1947 |
| 2,433,360 | Haight | Dec. 30, 1947 |
| 2,544,144 | Ellis | Mar. 6, 1951 |

FOREIGN PATENTS

| Number | Country | Date |
| --- | --- | --- |
| 300,832 | Germany | Dec. 13, 1949 |
| 325,849 | Germany | Sept. 21, 1920 |
| 478,268 | Great Britain | Jan. 17, 1938 |